Nov. 5, 1968 P. J. BILY 3,409,055
APPARATUS FOR HANDLING LIQUID CARGO
Filed Feb. 25, 1966 5 Sheets-Sheet 1
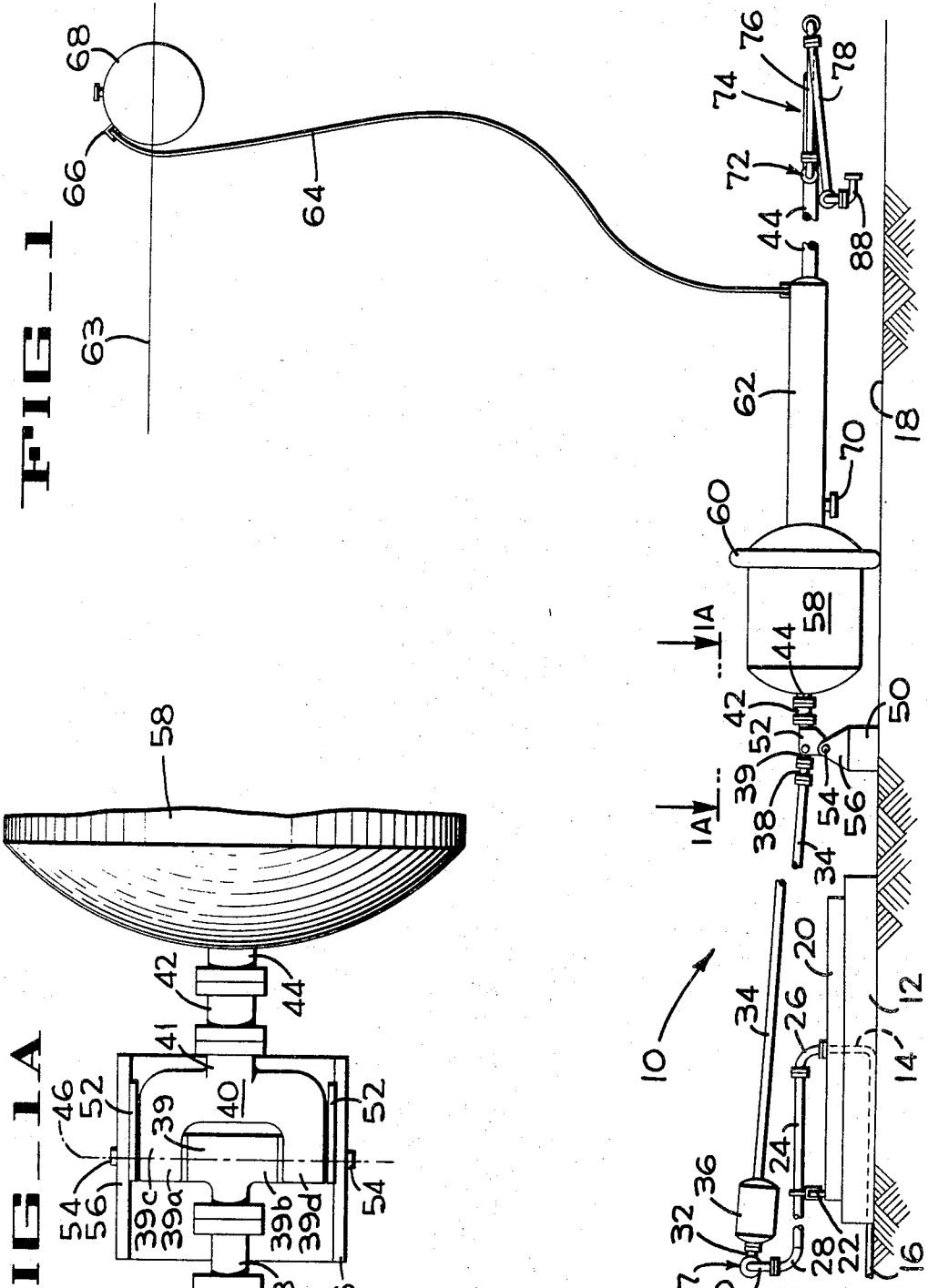
INVENTOR
PETER J. BILY
BY Francis W. Anderson
ATTORNEY

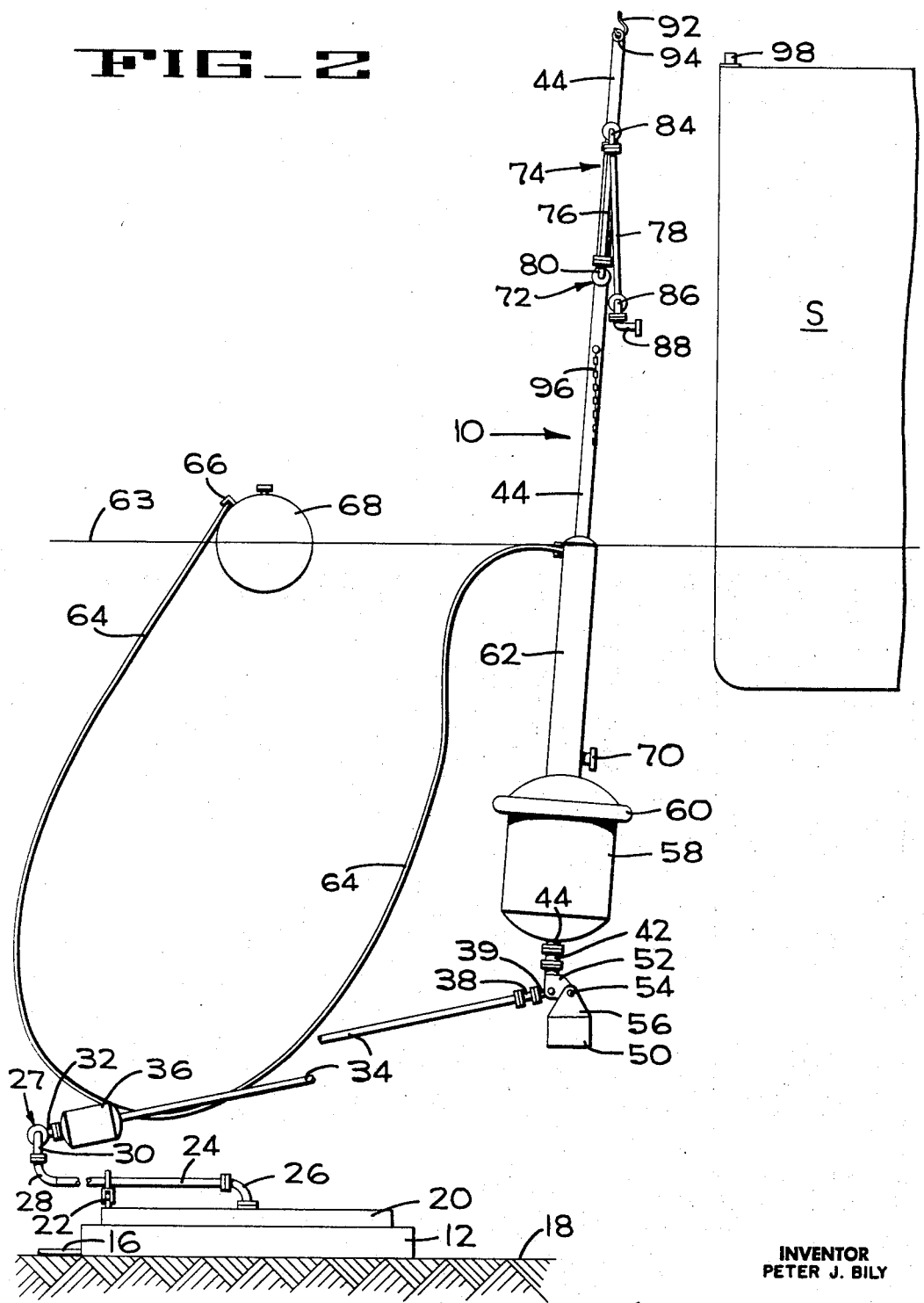

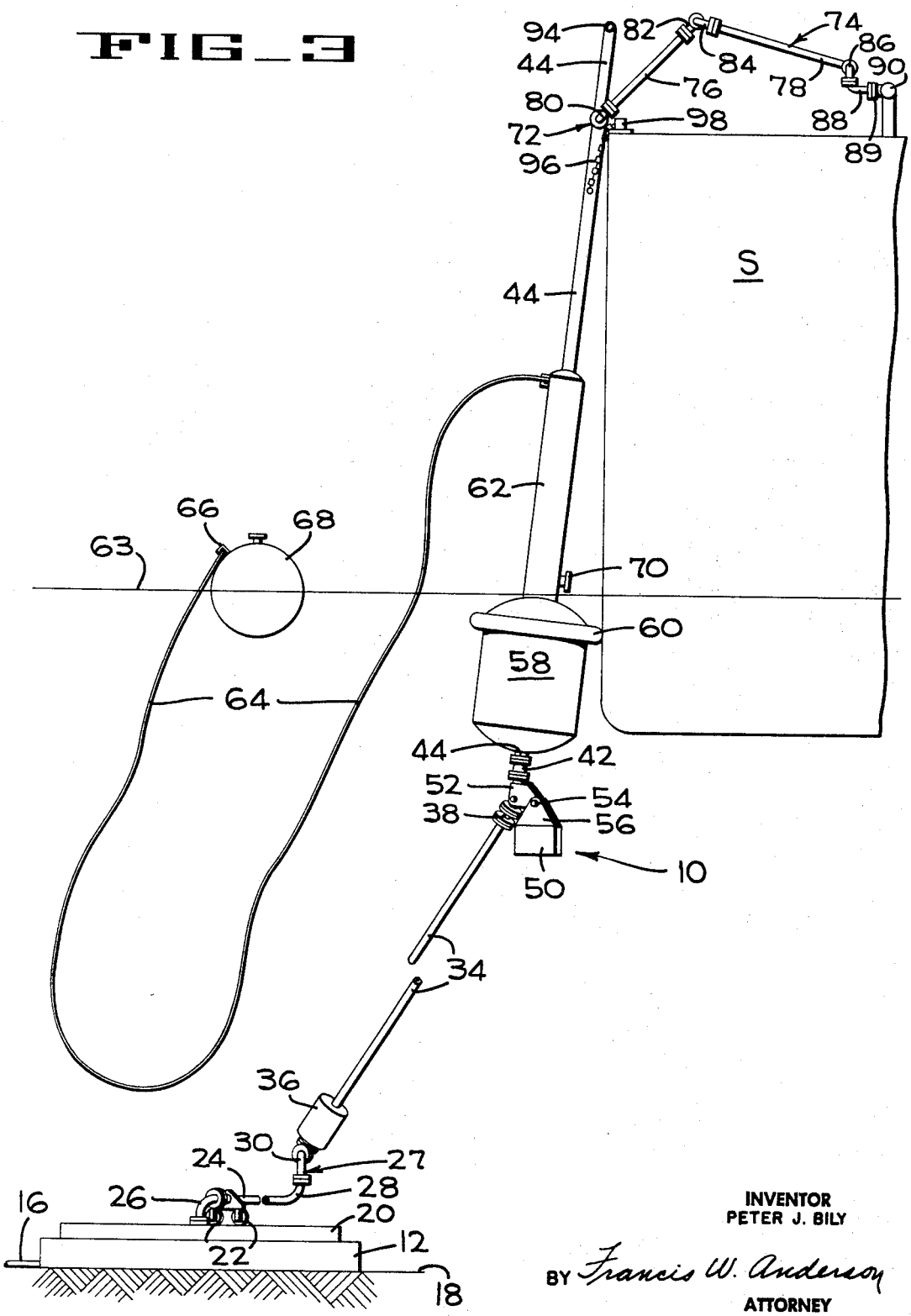

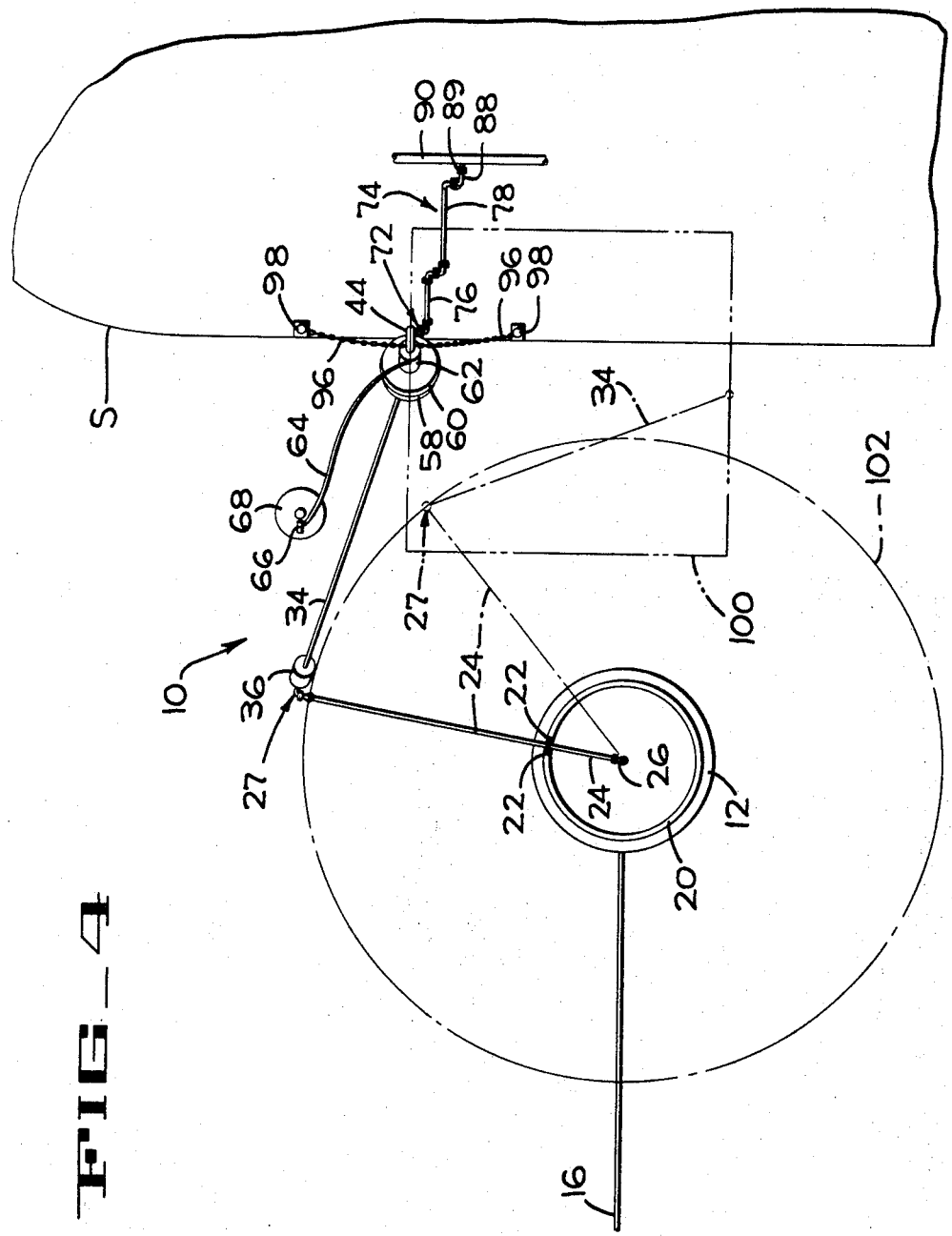

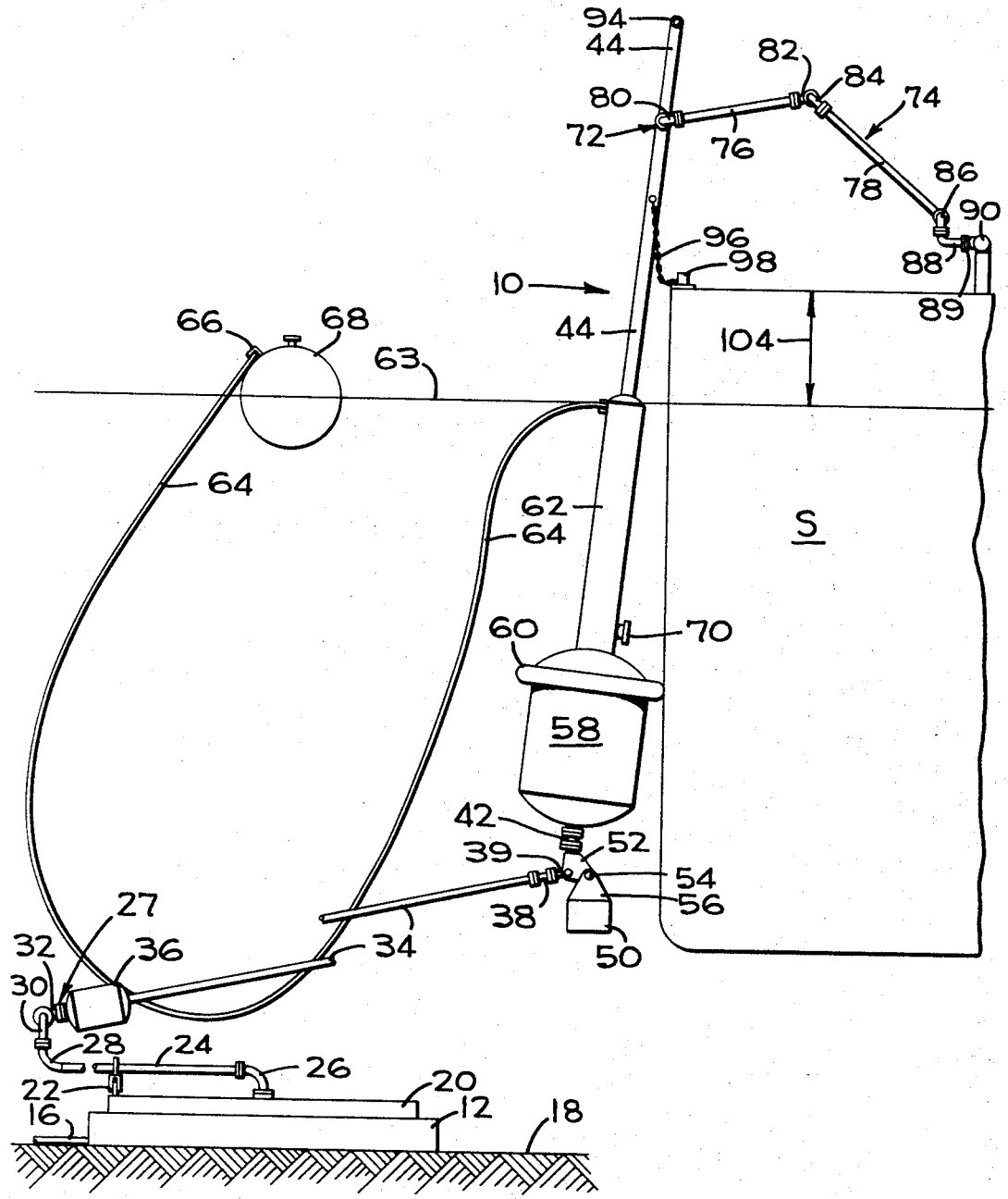

United States Patent Office 3,409,055
Patented Nov. 5, 1968

3,409,055
APPARATUS FOR HANDLING LIQUID CARGO
Peter J. Bily, Sunset Beach, Calif., assignor to FMC Corporation, San Jose, Calif., a corporation of Delaware
Filed Feb. 25, 1966, Ser. No. 530,121
12 Claims. (Cl. 141—387)

ABSTRACT OF THE DISCLOSURE

An apparatus for transferring fluid to or from a marine vessel floating offshore, including an elongate mast-like terminal movable between a wholly submerged position and a floating upright position, a buoyancy system for moving the terminal between these positions, an articulated loading arm mounted on the terminal for establishing fluid communication between the terminal and a vessel, a submerged anchor base to which the terminal is attached for universal movement with respect thereto by a system of rigid fluid conduits interconnected by swivel pipe joints, and a fluid conduit system connecting the terminal to a fluid reservoir.

The present invention pertains to the loading and unloading of liquid cargo with vessels that are moored in open water.

Transferring liquid cargo to and from a tank vessel is sometimes carried out with vessel moored offshore because some liquids can be most safely handled away from docks or wharves, and other shipping. Offshore loading is also carried out at harbors lacking port facilities, and in other instances where offshore loading may be more convenient or economical, even though dock space and associated loading apparatus may be available.

To insure the highest degree of safety, offshore loading apparatus must not present a navigation hazard, and because of tide, wind and other factors, should permit drifting of the vessel while it is being loaded or unloaded. It is also desirable that flexible hoses are minimized or eliminated in the loading apparatus, because hoses foul easily, and are both difficult and expensive to handle and replace. Coupling and uncoupling operations between the vessel and the loading apparatus should be capable of being carried out safely and quickly, due to the obvious dangers involved.

The cargo handling apparatus of the present invention meets these, and other other conditions and requirements by providing a hollow, fluid conducting mast which lies prone upon the sea bed, when inoperative, and is readily erected and coupled to the manifold of the cargo tank of a vessel. The mast is connected to articulated, rigid arms which conduct fluid to or from the vessel, and which communicate with fluid storage or supply means on or near the shore. The mast is capable of a wide range of motion about its submerged anchor so that the normal drifting of a conventionally moored vessel is accommodated without impairing the free movement or sealed relation between the various conduit members of the apparatus.

An object of the present invention is to provide improved apparatus for transferring liquid cargo to or from vessels moored offshore.

Another object of the invention is to provide tank vessel cargo handling apparatus which, when inoperative, lies horizontally near or upon the sea bed so that it is not a hazard to navigation.

Another object is to provide offshore, liquid-cargo handling apparatus which does not require flexible hoses or the like.

A further object is the provision of offshore cargo handling apparatus which can accommodate substantial drifting of the vessel while the apparatus is coupled to the cargo tanks of the vessel.

Another object is to provide a floatable cargo handling mast which is highly stable and has little wind resistance.

Other objects and advantages of the present invention will become apparent from the following description and from the accompanying drawings, wherein:

FIGURE 1 is a diagrammatic side elevation of the offshore cargo handling apparatus of the invention in an inoperative or storage position.

FIGURE 1A is a fragmentary, enlarged diagrammatic plan indicated along lines 1A—1A on FIGURE 1.

FIGURE 2 is a diagrammatic side elevation of the cargo handling apparatus in an erecter position prior to its being coupled to the cargo tank manifold of a vessel for a loading or unloading operation.

FIGURE 3 is a diagrammatic side elevation with the cargo handling apparatus coupled to the cargo tank manifold of the vessel.

FIGURE 4 is a diagrammatic plan, at a reduced scale, of the cargo handling apparatus and vessel shown in FIGURE 3, and particularly illustrates the limits to which the moored vessel can drift during a loading or unloading operation.

FIGURE 5 is a diagrammatic side elevation, similar to FIGURE 3, within the apparatus as positioned at the completion of a loading operation.

The cargo handling apparatus 10 (FIGS. 1 and 4), hereinafter referred to as loading apparatus, includes a circular anchor base structure 12 which surrounds a fixed vertical riser pipe 14 adjacent the mooring site of a tank vessel S. The riser pipe 14 is coupled to the seaward end of a product line 16, the shore end of which is not shown, and the anchor base 12 may be concrete imbedded in the sea bed 18, or can be cast around suitable subjacent piling. The shore end of the product line 16 may communicate with bulk storage tanks to receive or supply a liquid product transferred through the product line 16.

The upper surface of the anchor base 12 is provided with a circular track 20 which supports rollers 22 that depend from a horizontal conduit 24. The inner end of the conduit 24 is provided with a 90-degree swivel pipe joint 26 that interconnects the conduit 24 with the riser pipe 14 in sealed, fluid conducting relation, such that the conduit 24 is capable of unrestrained rotation about the axis of the riser pipe and is supported by the track and rollers during such rotation.

The other end of the horizontal conduit 24 is coupled to a swivel pipe joint assembly 27 comprising an upturned 90-degree L 28, a first 90-degree swivel pipe joint 30, and a second 90-degree swivel pipe joint 32. Coupled to the free end of the swivel pipe joint 32 is a conduit 34 that extends through a buoyancy tank or float 36 which buoys the outer end portion of the conduit 24 to minimize its bending. The swivel pipe joints 26, 30 and 32, and the various other fittings later described are of the well known flanged type secured to adjacent pipe flanges by bolts.

Due to the movement afforded by the swivel assembly 27, the conduit 34 can pivot upward about a substantially horizontal axis at the flange interconnection of the two swivel pipe joints 30 and 32, and can swing laterally about a substantially vertical axis at the juncture of the 90-degree L 28 and the swivel pipe joint 30.

The conduit 34 can also be displaced laterally relative to the conduit 24 by pivoting about a vertical axis at the flange connection of the swivel pipe joints 30 and 32, and the conduit 34 is rotatable at its end connection to the swivel pipe joint 32. As will presently appear, these possible movements are important in accommodating wind, tide and other conditions during operation of the loading apparatus 10 because in conjunction with other parts, they permit a substantial amount of drifting and other changes in the position of the tank vessel S while liquid cargo is transferred to or from the vessel.

At its outer end, the conduit 34 (FIG. 1A) is provided with an axial-flow swivel pipe joint 38 that is connected to the flanged central branch of a T 39. The aligned branches 39a and 39b of the T are in fluid communication with branches 39c and 39d of the swivel yoke 40. The branches 39c and 39d are rotatable about a generally horizontal axis 46. The central branch 41 of the swivel yoke 40 is, in turn, coupled by an axial swivel joint 42 to one end of a hollow, fluid-conducting loading mast 44. The loading mast 44 and the conduit 34 are capable of axial misalignment by relative pivotal movement about the axis 46 of the swivel yoke 40, and the mast, due to movement accommodated by the axial swivel joint 42, can rotate about its longitudinal axis relative to the swivel yoke 40. Stop means, not shown, may be associated with the swivel joint 42 to limit rotation of the mast 44 to approximately 90 degrees.

Even though the swivel yoke 40 can rotate relative to the conduit 34 because of the axial swivel joint 38, the axis 46 of the swivel yoke is urged toward a horizontal position by a massive counterweight 50 which depends from two spaced arms 52. The arms 52 are secured to the swivel yoke 40, and are pivotally connected by axially aligned stub shafts 54 to associated plates 56 which are integral with the counterweight 50. For reasons which will appear later, the axis of the shafts 54 is offset from the longitudinal axis of the loading mast 44.

A cylindrical buoyancy tank 58 surrounds the inner end portion of the loading mast 44 adjacent the swivel yoke 40 and is provided with an annular rope fender 60. Abutting the outer end of the buoyancy tank 58, which tank is subsequently referred to as the main tank, is a buoyancy tank 62 which is hereinafter referred to as the regulating tank. The main tank 58 is permanently evacuated, and the regulating tank 62 can be selectively evacuated from a remote position, such as at the surface 63 of the water. In its FIGURE 1 position, the regulating tank has been flooded with water to submerge the cargo handling apparatus 10, and in its FIGURE 2 position the regulating tank has been unflooded to erect the apparatus into its operative position.

Means for unflooding the regulating tank 62 include a flexible air line 64 which is connected to the outer end of the regulating tank and communicates with its hollow interior. The free end of the air line 64 is provided with a valve 66 and is secured to a marker buoy 68. When the regulating tank is to be unflooded in order to erect the loading apparatus 10, the air line 64 is retrieved by a launch crew who open the valve 66 and couple the air line to a compressor to displace the water in the regulating tank. It will be apparent that the air line 64 can lie on the sea bed 18 and be connected to a compressor located on shore, in which case the launch and crew will not be required. In either event, when air is pumped into the regulating tank 62, the water in the tank is forced out an open exhaust port 70 in proportion to the volume of air admitted.

When the necessary amount of water has been pumped out of the regulating tank to erect the loading mast 44, the valve 66 on the free end of the air line is manually closed so that air is trapped in the tank 62 when the air line is disconnected from the compressor in the launch.

While the regulating tank 62 is being evacuated, the loading mast 44 becomes progressively more buoyant, pivots about the axis 46 (FIG. 1A) and attains its FIGURE 2 upright position. Because the pivot axis at 54 for the counterweight 50 is offset from the longitudinal axis of the loading mast 44, the erected mast is slightly inclined away from the anchor base 12.

The upper end portion of the loading mast 44 (FIG. 2) is provided with a lateral outlet at 72 connected in fluid-conducting relation to a loading arm assembly 74 (FIG. 4) which provides a flexible, fluid-conducting assembly of rigid conduits and swivel pipe couplings to transfer liquid between the loading mast and the cargo tanks of the vessel. The loading arm assembly 74 comprises rigid conduits 76 and 78, and swivel pipe joints 80, 82 and 84.

The swivel pipe joint 80 connects the conduit 76 to the loading mast 44 for pivotal movement of the conduit 76 in a substantially vertical plane, and adapts the conduit 76 for rotation about its axis. Swivel pipe joints 82 and 84 interconnect the conduits 76 and 78 so that the conduits can be folded or jackknifed together, or extended, and maintain the conduits in sealed, fluid conducting relation irrespective of their relative alignment. A swivel pipe joint 86 is mounted on the outer end of the conduit 78 and is couple to a 90-degree L flange adapter 88 for coupling the loading arm to a corresponding member 89 (FIG. 3) on a manifold 90 of the tank vessel S. The tank vessel is moored alongside the loading apparatus 10 by means of conventional mooring lines, not shown, after the loading apparatus is positioned in its effective position, as shown in FIGURE 2, by evacuating the regulating buoyancy tank 62 in the manner previously described.

With the loading apparatus 10 erected, and the tank vessel S moored, a line 92 of the vessel's boom hoist (not shown) is lowered over the side of the vessel and is coupled to an eye 94 on the upper end of the loading mast 44 preparatory to lifting the entire loading apparatus 10 far enough to permit coupling the loading arm assembly 74 to the vessel's manifold 90.

It is a particular feature of the invention that the heaviest portion of the loading apparatus 10 is submerged both before and during loading so as to enhance the stability of the apparatus and minimize the effects of wave action and wind, yet to keep the effective weight of the buoyed apparatus within the usual lifting capacity of the vessel's boom hoist. In the present instance, the buoyed weight of the loading apparatus 10 is designed for a vessel having a boom hoist with a five-ton capacity and the buoyed weight will remain less than five tons while the main buoyancy tank 58 is submerged, even though the actual weight of the counterweight 50, alone, is in the order of twenty tons.

The boom hoist line 92 (FIG. 2) is retrieved until the upper end of the main buoyancy tank 58 is about to break surface, as shown in FIGURE 3. In this position of the loading mast, the open exhaust port 70 of the regulating buoyancy tank 62 is above the surface of the water, and the regulating tank will thus remain unflooded after the compressed air in the tank escapes. With the loading mast 44 thus positioned, the loading arm assembly 74 is near the vessel's deck, and can be positioned closer by swinging the boom hoist line 92 (FIG. 2) inboard. Deckhands then secure the free ends of two anchor chains or lines 96 (FIGS. 3 and 4), which are each fixed at one end to the loading mast 44, to spaced deck cleats or bollards 98. The boom hoist line 92 is then either slackened or cast off, and the loading arm assembly 74 is coupled to the ship's manifold 90. It will be noted that the loading mast 44 is now supported solely by the anchor lines 96 because gravity tends to return the loading mast to its FIGURE 2 buoyed position. Loading or unloading of the cargo can now be carried out; during such an operation, the vessel S will normally drift due to wind, tide and wave action because the mooring lines which anchor the vessel are somewhat slack.

In the embodiment of the invention herein set forth the vessel S (FIG. 4) can drift both lengthwise and sidewise, as well as roll, pitch and yaw, without affecting the fluid conducting connection of the loading apparatus 10. In other words, the loading mast 44 can be safely operated anywhere in the area bounded by the dotted outline 100, but this is of course due merely to dimensional relations that can be changed to suit various conditions as may be required. During the drifting of the vessel, the swivel joint assembly 27 will follow the circular path 102 which lies on an arc generated from the vertical riser pipe 14 (FIG. 1).

Further operational features of the invention, with continued reference to FIGURE 4, are noted as follows: Due to the capability of the loading mast 44 to rotate because of the axial swivel connector 42 (FIG. 1A), the loading arm assembly 74 can remain substantially normal in a horizontal plane to the longitudinal edge of the vessel S while the conduits 24 and 34 jackknife during drifting of the vessel and the conduit 24 swing about the axis of the riser pipe 14. This eliminates bending stress at the manifold connection even through the conduit 34 may be far from perpendicular (in a vertical plane) to the side of the vessel.

Further, the counterweight 50 provides a powerful righting force which not only inhibits swaying motion of the erected loading mast 44 fore and aft relative to the vessel S, but also tends to maintain the fender 60 engaged with the hull of the vessel. Swaying of the mast 44 due to wind conditions is minimal, even before the loading arm assembly 74 is anchored to the bollards 98 and connected to the manifold 90, because the mast and loading arm have little wind resistance due to their small-area profiles.

As the vessel S (FIG. 5) becomes loaded and its freeboard dimension 104 diminishes, the loading mast 44 settles in the water toward its FIGURE 2 buoyed condition. However, since the air initially under pressure in the regulating tank 62 escaped when the exhaust port 70 cleared the surface as illustrated in FIGURE 3, the regulating tank 62 will partially flood when the exhaust port 70 submerges during loading of the vessel even though the upper end of the air line is closed by the valve 66. Accordingly, in order to increase buoyancy, the valve 66 can be opened and pressurized air again pumped into the tank 62 to remove the water. Thus, if the anchor lines 96 are tight because they are too short to be cast off, they can be slackened by this procedure when the vessel S is fully loaded. Another alternative is that the mast can be coupled to the boom hoist line 92 and prevented from settling before or after the loading is completed to keep the anchor lines loose. Anchor lines of the desired length, however, will automatically become slack when the vessel is loaded so that at the completion of a loading operation, as shown in FIGURE 5, it is merely necessary to uncouple the loading arm assembly 74 from the manifold 90, cast off the loose anchor lines 96, and the vessel can then depart. The launch crew then closes the air line valve 66, uncouples the air line 64 from the compressor in the launch, and opens the valve 66 so that the regulating tank 62 becomes fully flooded and the loading mast 44 returns to its FIGURE 1 submerged position lying on the sea bed 18.

Because the pivotal connection at 54 of the counterweight 50 is offset from the longitudinal axis of the loading mast 44, the mast always tilts away from the anchor base 12 and returns to its initial position extending away from the anchor base when the regulating tank 62 is flooded. Although not shown or described herein, it will be apparent that conventional means, such as a simple tie line or chain, can be provided to hold the loading arm assembly 74 is folded condition against the loading mast 44 whenever the loading arm assembly is not coupled to the manifold 90.

In summary, the permanent anchor base 12 and the rigid articulated conduit assembly comprising the conduits 24 and 34, the swivel pipe joint assembly 27, the float 36 and the swivel yoke 40, adapt the loading mast 44 for movement in any direction with the drifting vessel S and at the same time eliminate the use of flexible hoses which are often dangerous to handle, can easily foul, and which most likely require more frequent replacement than articulated metal conduits. The loading mast unit including the swivel yoke 40, counterweight 50, the loading mast 44 and the main and regulating buoyancy tanks 58 and 62 is also important because the mast, when erected, is very stable due to its small exposed area and massive, submerged substructure, yet the buoyed weight of the mast is within the relatively small lifting capacity of the boom hoist on an ordinary tank vessel. A further important feature is the offset relation of the counterweight 50 with the loading mast so that the mast tilts the erected loading mast 44 toward the vessel and thus facilitates the manual coupling of the loading arm assembly 74 to the manifold of the vessel. Another valuble feature is that because the erected mast 44 is hoisted into position when it is used to load an empty vessel and is then secured to the vessel by the anchor lines 96, the mast automatically settles with the vessel to a point where the anchor lines 96 are slack when the vessel is loaded, and the uncoupling of the loading apparatus 10 is then easily and safely carried out. Conversely, if the loading apparatus 10 is used for the unloading of a vessel, the initial coupling of the loading arm assembly 74 to the manifold 90 corresponds to the FIGURE 5 position and is even more rapidly effected than the loading operation described since the initial hoisting operation is eliminated. As the vessel rises during unloading, the anchor lines 96 lift the loading mast assembly to its FIGURE 3 position, and after unloading the vessel, the mast 44 is lifted by the boom hoist line 92 until the anchor lines 96 are slack and can be cast off. The loading mast is then lowered in the water, and the hoist line 92 is easily detached from the mast because the eye 94 is above the deck surface of the empty vessel.

While a particular embodiment of the apparatus of the present invention has been herein shown and described, it will be apparent that modification and variation may be made without departing from the spirit of the invention, and that the scope of the invention should be limited only by the claims appended hereto.

Having thus described the invention, that which is believed to be new, and for which protection by Letters Patent is desired, is:

1. An apparatus for transferring fluid between a source thereof and a floating marine vessel, comprising an elongate loading mast movable between a wholly submerged inoperative position and a floating upright operative position in which the upper end of said mast projects above the surface of the water; a permanently evacuated main buoyancy tank mounted on said mast adjacent the end portion thereof remote from said upper end; a regulating buoyancy tank carried by said mast intermediate said main tank and said upper end, said regulating tank capable of being selectively evacuated or flooded, evacuation of said regulating tank floating the mast into said operative position and flooding of said regulating tank causing the mast to submerge to said inoperative position, the buoyed weight of the lower portion of the mast being heavier than the buoyed weight of the upper portion of the mast when said regulating tank is evacuated so as to stabilize the mast in said upright position; means for anchoring the mast to the floor of a body of water; and fluid conduit means connecting the mast to a shore-based fluid reservoir.

2. Apparatus according to claim 1 wherein said main buoyancy tank maintains the buoyed weight of said loading mast within the lifting capacity of the boom hoist of a vessel.

3. Offshore loading apparatus according to claim 1 wherein the upper end of said loading mast is provided with means for coupling said mast in fluid communication with the manifold of a vessel, and wherein said main buoyancy tank remains at least partially submerged after the loading mast is coupled to said manifold.

4. Apparatus according to claim 1 wherein the lower end portion of said loading mast is provided with a counterweight offset from the longitudinal axis of the mast so that the mast tilts in the direction of the counterweight when the loading mast is sunk.

5. Apparatus according to claim 4 wherein said counterweight and buoyancy tanks are so related to the longitudinal axis of said loading mast that the mast is biased from vertical in said operative position.

6. Apparatus according to claim 5 in which said main buoyancy tank is provided with a laterally projecting fender engageable with the hull of a vessel whereby when the loading mast is erected and tilted toward the vessel, the fender engages the hull and the upper end portion of the tilted mast lies adjacent the juncture of the deck and hull of the vessel.

7. Apparatus according to claim 4 wherein said fluid conduit means includes an upright submerged riser pipe anchored in fixed position near the sea bed, an articulated conduit, and first and second swivel means respectively interconnecting said riser pipe and said loading mast to said articulated conduit for substantially universal movement of said loading mast relative to said riser pipe.

8. Apparatus according to claim 7 in which said loading mast is pivotable about said second swivel means in an upright plane including the adjacent section of said articulated conduit, and wherein said mast is rotatable about its longitudinal axis.

9. Apparatus according to claim 7 wherein an arcuate track is mounted in concentric relation to said riser pipe and one rigid portion of said articulated conduit extends over said track, and a depending roller mounted on said rigid conduit portion and supportingly engaged with said track.

10. Apparatus for loading offshore vessels comprising a submerged anchor base located on the sea bed adjacent a mooring site, a riser pipe extending upward through said anchor, a product line in fluid communication with said riser pipe for transferring liquid to and from said riser pipe, a first swivel pipe joint connected to said riser pipe, a first rigid conduit connected to said first swivel pipe joint and extending substantially horizontally over the upper surface of said anchor for swinging movement about said riser pipe, a circular track mounted atop said anchor in concentric relation to said riser pipe, a roller depending from said first conduit and supported by said track, a first swivel pipe joint assembly mounted on the free end of said first conduit, a second rigid conduit connected to said first swivel pipe joint assembly, said first swivel pipe joint assembly adapting said second conduit for universal swinging movement relative to said first conduit, a second swivel pipe joint assembly including a swivel yoke mounted on the free end of said second conduit, an elongate loading mast connected to and adapted by said second swivel joint assembly to move between upright and substantially horizontal positions irrespective of the attitudes of said first and second conduits, and an articulated hollow loading arm carried by said loading mast, said loading arm being in fluid communication with said second conduit through said loading mast and adapted to be coupled to the manifold of the cargo tanks of a vessel when said loading mast is upright.

11. Apparatus according to claim 10 and further including a permanently evacuated main buoyancy tank mounted on said loading mast adjacent said second swivel pipe joint assembly, and a selectively evacuable regulating buoyancy tank mounted on said loading mast between said main tank and said loading arm, said regulating tank when evacuated being effective to erect said loading mast to an upright position in which said loading arm is spaced above the surface of the water.

12. Apparatus according to claim 11 in which a counterweight is suspended from said loading mast to stabilize the mast in upright position, said counterweight being offset from the longitudinal axis of said loading mast at that side of the mast remote from said anchor base so that the mast tilts away from said anchor base.

References Cited

UNITED STATES PATENTS

| | | | |
|---|---|---|---|
| 3,077,615 | 2/1963 | Schultz | 9—8 |
| 3,080,583 | 3/1963 | Fuller | 9—8 |
| 3,236,266 | 2/1966 | Bily | 141—388 X |
| 3,236,267 | 2/1966 | Bily | 141—387 X |
| 3,256,537 | 6/1966 | Clark | 9—8 |
| 3,360,810 | 1/1968 | Busking | 9—8 |

FOREIGN PATENTS 504,166 4/1939 Great Britain.

LAVERNE D. GEIGER, *Primary Examiner.*

E. J. EARLS, *Assistant Examiner.*